Jan. 15, 1935.  G. BAUER ET AL  1,987,985
POWER TRANSMISSION MECHANISM
Filed Oct. 21, 1933   3 Sheets-Sheet 1

INVENTORS
Gustav Bauer
Carl Schmieske
BY
ATTORNEYS

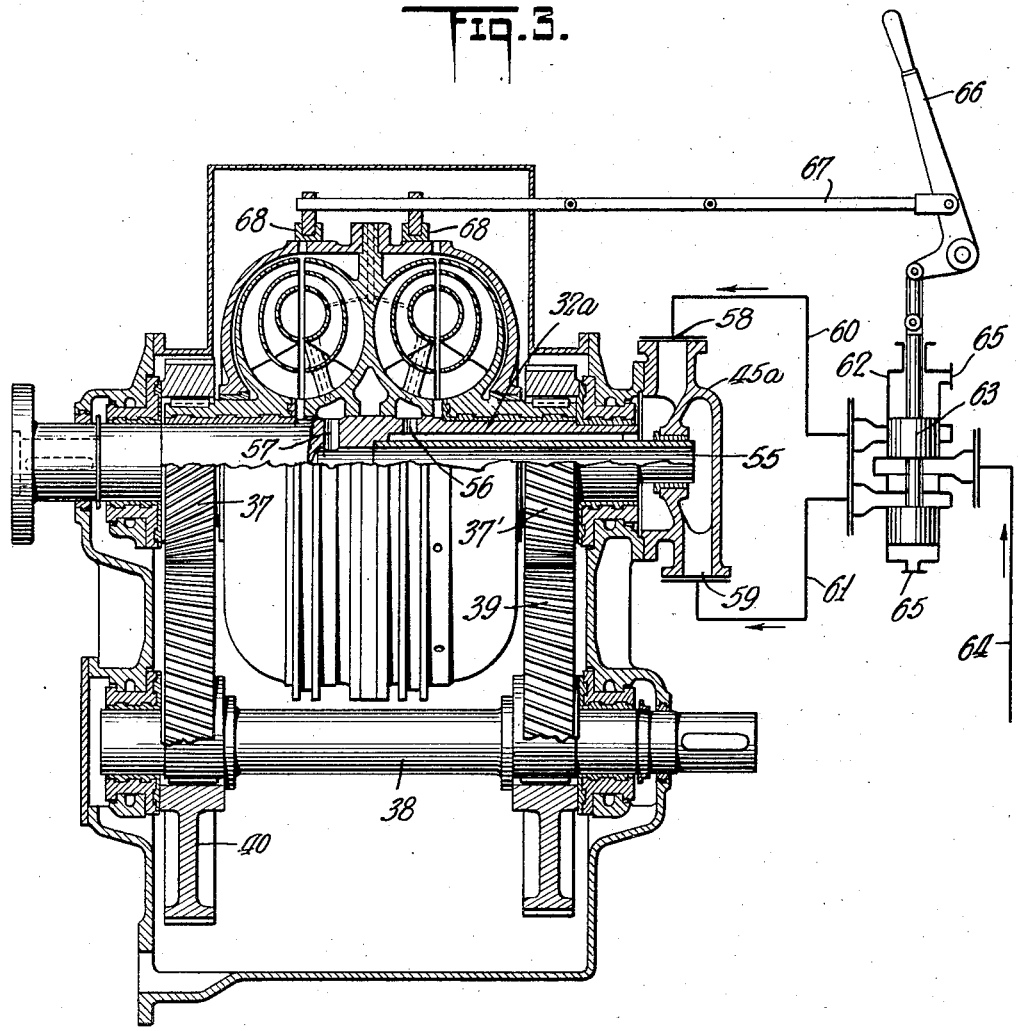

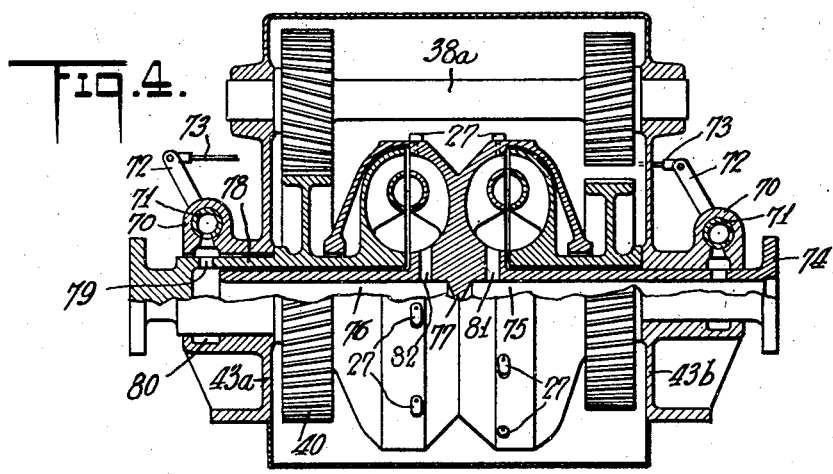
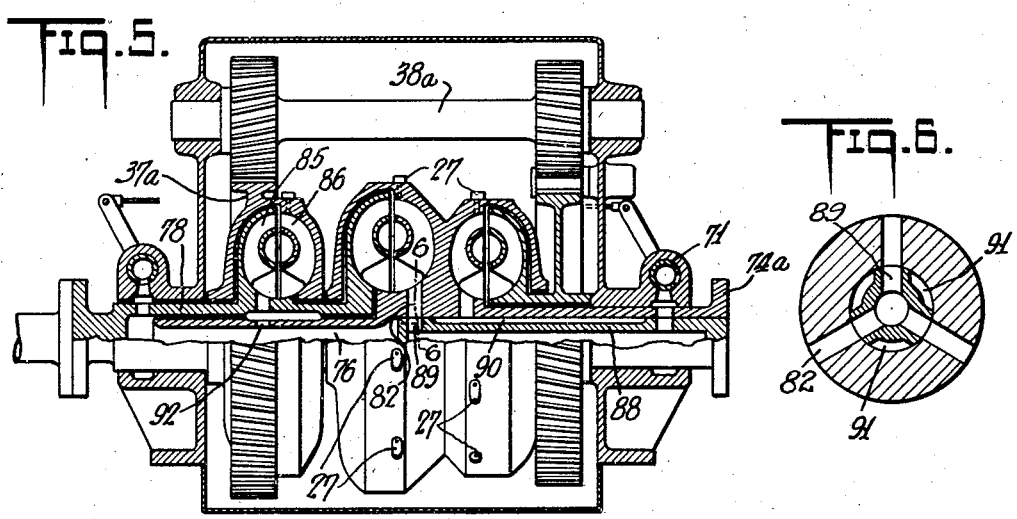
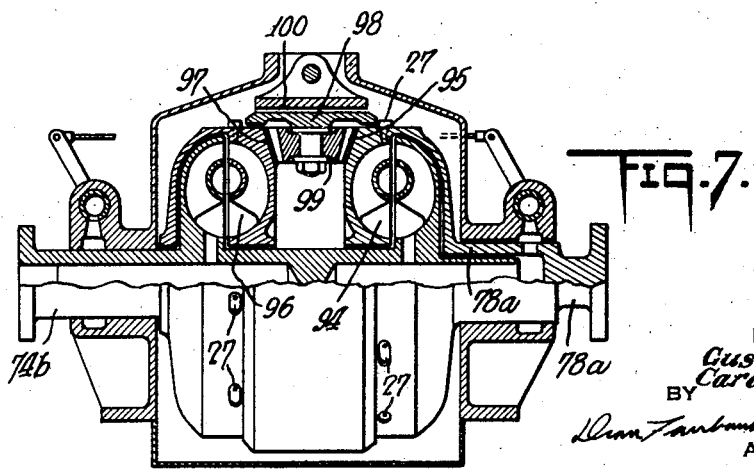

Patented Jan. 15, 1935

1,987,985

UNITED STATES PATENT OFFICE 1,987,985

POWER TRANSMISSION MECHANISM

Gustav Bauer, Hamburg, and Carl Schmieske, Bremen, Germany

Application October 21, 1933, Serial No. 694,558
In Germany and France November 4, 1932

18 Claims. (Cl. 60—54)

This invention relates to power transmission mechanism of the type in which there are employed a plurality of hydraulic power transmitters of the Föttinger or Vulcan type, and which are juxtaposed and combined with gearing whereby the driven member may be rotated in either direction desired. A mechanism of this general type is shown in British Patent 232,548.

The main object of the present invention is to provide improved means whereby the filling and emptying of the working chambers of the hydraulic couplings may be more effectively controlled. The improved mechanism in the preferred form illustrated is particularly adapted for use in transmitting the power from an internal combustion engine to the propeller shaft of comparatively small high speed boats.

A further object of the invention is to render the construction more compact and to simplify and reduce the bearings for the rotatable parts.

By means of our improved construction the propeller shaft may be driven ahead or astern at any desired speed up to full speed, or may be stopped without varying the direction or speed of the engine.

The invention embodies various features, details and arrangements of parts which will be pointed out more in detail hereinafter and set forth in the claims.

The accompanying drawings illustrate merely several embodiments of the invention. In these drawings:

Fig. 3 is a longitudinal section partly in section and showing somewhat diagrammatically a modified form of fluid controlling means.

Fig. 4 is a somewhat more diagrammatically illustrated longitudinal section through another form, certain parts being in side elevation, and the fluid for the two couplings being delivered from opposite ends.

Fig. 5 is a section similar to Fig. 4, but showing three couplings.

Fig. 6 is a sectional detail on line 6—6 of Fig. 5, and

Fig. 7 is a section similar to Fig. 4, but with a different type of gearing between the couplings.

Figure 1:
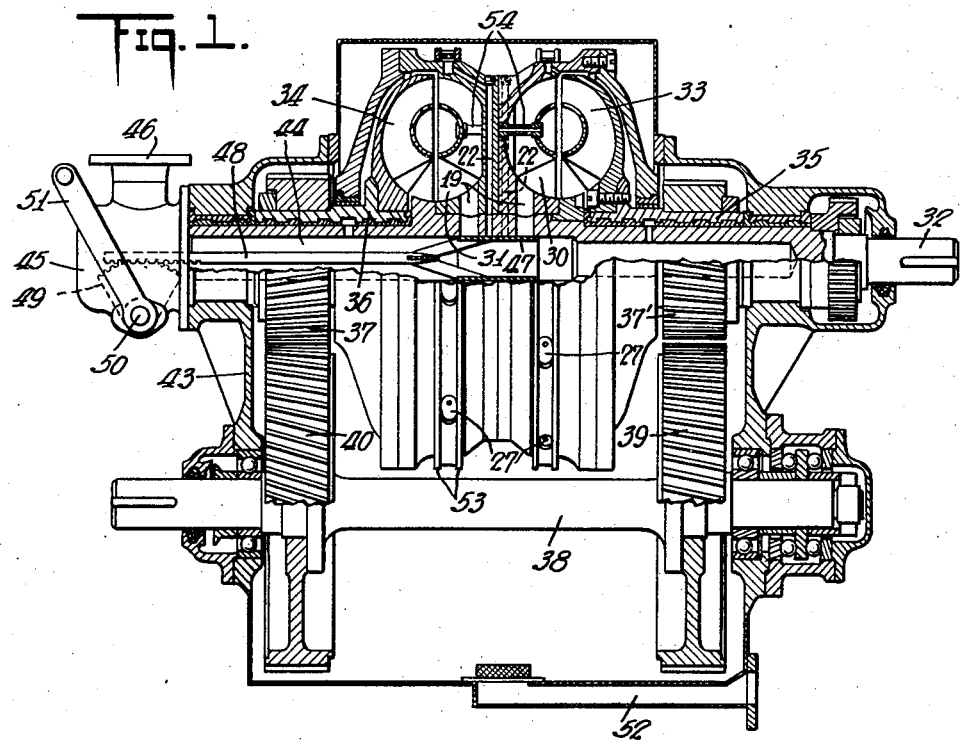
Fig. 1 is a longitudinal section through a mechanism embodying the invention.
Figure 2:
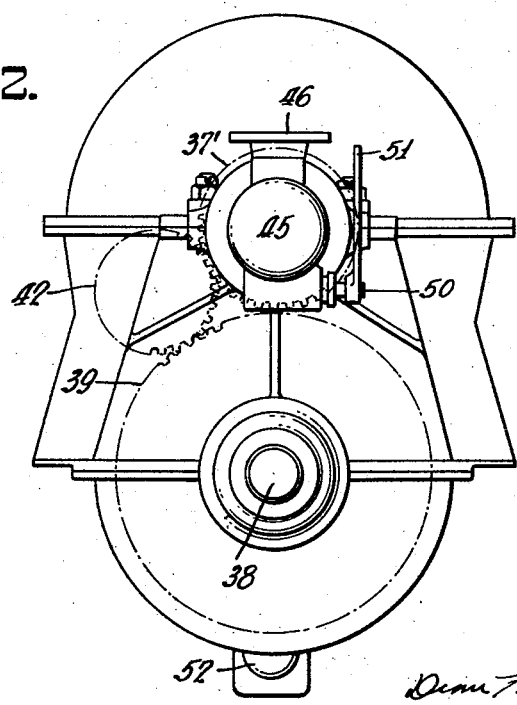
Fig. 2 is an end view.

In the construction illustrated in Figs. 1 and 2 there are employed two juxtaposed couplings having driving members 30 and 31 which may if desired be integral and back to back, and connected to a driving shaft 32. The driven members 33 and 34 are connected to separate sleeves 35 and 36 rotatable on the shaft 32, and having separate pinions 37' and 37. The driving members 30 and 31 may be formed integral with casings enclosing the driven members. The frame which supports the shaft 32 may support a separate driven shaft 38 having gears 39 and 40. The gear 40 may directly mesh with the pinion 37, while the gear 39 may mesh with an idler 42 meshing with the pinion 37'. The entire coupling and the gears and pinions may be mounted in the same casing 43.

It will be noted that there are provided only two main bearings for the two couplings and the aligned shaft. The frame 43 provides these two bearings, for the shaft 32 and the driving members are both rigidly secured to this shaft intermediate of its ends. The two bearings are spaced apart only to the distance required by the two couplings and the two gears 37 and 37', so that the minimum space is occupied by the complete apparatus and the couplings are brought as near as possible to the bearings supporting the shaft.

Instead of providing separate bearings for the driven members of the couplings, as shown in British Patent 232,548 above referred to, the driven members and the pinions 37' and 37 are mounted on sleeves 35 and 36 which are rotatable in respect to the shaft 32. Thus there are only two bearings on the frame and these are spaced apart to the minimum distance. This arrangement is possible by reason of the fact that instead of delivering the liquid through the annular passages between the sleeves and the shaft it is delivered through a passage in the shaft itself.

The shaft 32 at one end has a central passage 44 leading to a liquid supply coupling 45 to which liquid may be delivered from an overhead tank through a conduit connected to the inlet 46. Mounted within the hollow shaft 32 is a slide valve 47 in the form of a sleeve, and connected to an operating rod 48 extending lengthwise of the shaft into the supply coupling 45. Here it may be provided with rack teeth engaging a segmental rack 49 on a rock shaft 50 having a control lever 51.

The passage 44 is provided with separate supply passages 19, both of which may be closed, or either of which may be opened by the longitudinal movement of the sleeve or valve member 47. The couplings may be of the type in which there are a series of small permanently open outlets at the periphery and the liquid is continuously supplied to the coupling employed for transmitting power at a rate in excess of the rate at which the liquid may escape, so as to keep the coupling filled, but if the inlet port to the coupling be closed the coupling will comparatively rapidly empty.

In the form shown in the drawings there is shown somewhat conventionally the type of outlet control valves shown in Patent No. 1,979,930, granted on our copending application Serial No. 670,530, filed May 11th, 1933. Each outlet port has a flap valve pivoted intermediate of its ends and mounted in a casing 27, and liquid may be delivered through a passage 22 to one end portion of each flap valve to close the latter and prevent escape of liquid from the working chamber, or upon shutting off the supply of liquid through the passages 22 the flap valves will move to open the outlet ports. These flap valves may be pivotally mounted between flanges 53. Such construction is not illustrated in the present application as it forms no portion of the present invention and is not essential to the operation of the coupling, but the passages 22 have been shown leading from the center passage 44 to the outlet flap valves.

With the parts in the position shown, the control lever 51 is in intermediate position and the valve 47 closes the passages 19 and 22 of both couplings. By moving the control lever 51 clockwise the passages 19 and 22 of the left hand coupling will be opened and liquid from the overhead tank will fill the left hand coupling through the left hand passage 19, and at the same time will flow through the left hand passage 22 to close the outlet ports of that coupling. Air may escape from either coupling through the air outlet conduits 54 leading both from the core and the working chamber to the outlet, and the shaft 38 will be driven in one direction through the pinion 37 and gear 40. By moving the control lever 51 to the opposite limiting position the passages 19 and 22 of the left hand coupling will be closed and the corresponding passages of the right hand coupling will be opened and the shaft 38 will be driven in the opposite direction through the pinions 37′ and 42 and the gear 39. With the slide valve in the position shown the liquid will escape from both of the couplings and the shaft 38 may be brought to rest even though the shaft 32 is continuing to rotate at full speed. As a short time interval is required for both filling and emptying, it will be noted that the slide valve may be moved from one extreme to the other, that is, from the ahead position to the reverse position without stopping in the intermediate position, and as one coupling is gradually emptying and the other one gradually filling, the driven members will rapidly slow down until they come to rest, and will instantly start rotating in the opposite direction and will pick up speed until the coupling which was previously filled will be completely emptied and the one which was previously empty will become filled. This is of great importance in providing a resilient and yielding drive between a non-reversible engine and the propeller shaft.

The couplings do not contain any parts which present friction and there is no wear or tear. A reversing may be accomplished without any jerking, any undue strain, and without sudden shocks such as occur in the use of ordinary gears and clutches. All of the parts being rotatable, the gear teeth and bearings are protected from the strain of temporary overloads. Reversing is effected with a complete absence of noise, and the control may be effected from a distance through any transmission mechanism connected to the lever 51.

The liquid which escapes from either coupling collects in the bottom of the casing 43 and may be withdrawn by a suitable pump through a conduit 52 and returned to the overhead tank. By using a lubricating oil as the fluid for operating the couplings this fluid will also serve for the lubrication of the gears as the gears 39 and 40 have their peripheries closely adjacent to the bottom of the casing.

In the form shown in Fig. 3, the control valve is mounted outside of the shaft of the coupling. In this form the coupling may be provided with a peripherally located, axially movable ring valve for controlling the outlet if desired. Inside of the shaft 32a there is provided an inner tube 55 so as to form two concentric passages. The outer passage communicates with one coupling through a port 56, while the inner passage communicates with the other coupling through a port 57. At the outer end the liquid supply coupling 45a has a partition and two separate inlets 58 and 59, one communicating with the outer passage in the shaft and the other with the inner passage. The two ports 58 and 59 are connected by conduits 60 and 61 to a valve 62 having a valve member 63 which may serve to connect either of the conduits 60 or 61 with a supply conduit 64, and the other with an exhaust passage 65. The valve member 63 may be operated by a lever 66 which may be connected by a link 67 to the two outlet controlling ring valves 68 on the two couplings. With the valve lever in the position shown liquid is supplied through the conduits 64 and 61 to the port 59 to fill the left hand coupling, and the outlet of this coupling is closed by its ring valve 68. By moving the lever 66 to the opposite limiting position the supply of liquid to the left hand coupling will be shut off, and the outlet of this coupling will be opened. At the same time liquid will be supplied to the right hand coupling through conduits 60 and 32a, and the outlet of the right hand coupling will be closed.

By moving the lever to an intermediate position no liquid will be supplied to either coupling, and the outlets of both couplings will be open to permit emptying thereof, so that no power will be transmitted to the driven shaft 38.

In the specific form of hydraulic coupling illustrated in Fig. 3 there are shown guide vanes between the core and the outer wall of the working chamber. This is disclosed in the Kiep and Brose Patent 1,904,054, issued April 18, 1933. Instead of delivering the working liquid between the driving and driven members of the coupling, the passages 56 and 57 are shown as leading to annular chambers in the driving members, and the liquid may pass from these through radial conduits to the interior of the core and thus fill the working chambers from the center outwardly.

The construction illustrated in Fig. 4 is similar in many respects to those illustrated in Figs. 1 and 3 except for the method of controlling the supply of fluid to the two couplings. In this form the end walls 43a and 43b which support the bearings for the shafts are provided with valve casings 70 containing rotary valves 71, the latter having valve levers 72 connected together by a rod 73. The rotary valves 71 are of the hollow cylindrical type whereby fluid may be delivered endwise into the valve and each valve is provided with a port which may be brought into or out of registry with a port in the valve casing to control the flow of the fluid into the longitudinal passages of the shaft.

The shaft 74 has passages 75 and 76 extending lengthwise thereof at opposite ends and separated by an intermediate partition or transverse wall 77. The shaft 74 is closed at one end by a sealed shaft bolted to the end of the shaft 74 or by a transverse wall as shown at the right of Fig. 5, or in any other suitable manner, and at the other end is mounted in a sleeve 78 which carries the gear 40 and projects beyond the end of the casing whereby it may be connected to another shaft or to the prime mover or the apparatus to be driven. The shaft 74 terminates short of a port 79 in the sleeve 78 whereby liquid delivered through the adjacent valve 71 into a chamber 80 within the end wall 43b may flow through said port into the passage 76 of the shaft 74. The two passages 75 and 76 are connected by ports 81 and 82 to the driving members of the two couplings respectively.

In this construction it will be noted that the input and output elements are in axial alignment and the intermediate shaft 38a and its gears serve only to transmit power from the sleeve 78 through the gearing, the intermediate shaft and the right hand coupling to the shaft 74 if the right hand coupling be filled, or runs idle if the left hand coupling be filled and the right hand coupling be empty. By moving the rod 73 endwise one of the valves 71 may be open and the other closed almost instantly. The fluid may be permitted to escape from the couplings by the same valve mechanism as is illustrated in Fig. 1 or in Fig. 3 or in any other suitable manner, and if the mechanism shown in Fig. 3 be employed then the ring valves may be operatively connected to the rod 73.

The form shown in Fig. 5 is similar in many respects to that shown in Fig. 4, that is, the input and output of power is in axially aligned parts and the flow of fluid to and from the couplings is controlled by the same type of valve mechanism. In this construction there are employed three couplings, two of which are smaller than the other one and are connected in series. The right hand coupling shown in Fig. 5 may be the same as that shown at the right of Fig. 4 and the middle coupling in Fig. 5 may be the same as that shown at the left of Fig. 4. There is provided an additonal coupling including a driving member 85 and a driven member 86, the driving member being connected to a gear 37a. The shaft 74a which is directly connected to the driven members to the middle and right hand couplings has a central annular tube 88 communicating with the right hand valve 71 and closed at its inner end. Adjacent to the inner end there is a port 89 registering with the port 82 leading to the middle coupling. The tube 88 is spaced from the shaft to leave an annular passage 90 which communicates through passages 91 with the passage 76 in the shaft 74a.

In operation and with the valves in the position illustrated in Fig. 5 the fluid entering the left hand valve 71 may flow through a port 92 into the driving member 85 of the left hand coupling and may also flow through the passages 91 and 90 into the operating circuit of the right hand coupling. Power will be transmitted through the left hand coupling and the gear 37a to the intermediate shaft 38a, thence through the reversing gear to the driving member of the right hand gear and from the driven member of the right hand gear to the shaft 74a. Thus in reversing the right hand and left hand couplings are in series with the reversing gearing, one being in front of the gearing and the other beyond it. By shifting the valves to the opposite limiting position the liquid to the two end couplings will be shut off and liquid may flow through the tube 88 to the middle coupling.

Power will be transmitted from the sleeve 78 through the middle coupling directly to the driven shaft 74a. No power will be transmitted to the intermediate shaft 38a because the two end couplings will be empty. Thus in this construction the intermediate shaft may stop and remain stationary during the forward driving of the shaft 74a and all wear and power losses involved in the rotation of the shaft 38a and the gears will be avoided.

The construction shown in Fig. 7 involves a fluid control substantially identical with that shown in Fig. 4, but the couplings are connected by a different type of gearing. The driving member 94 of the right hand coupling is connected to the sleeve 78a and is provided with a beveled gear 95. The driving member 96 of the left hand gear is provided with a similar beveled gear 97. The driven members of the two couplings are directly connected to the shaft 74b. Between the two couplings there is an annular member 98 which carries a plurality of pinions 99 meshing with the two beveled gears 95 and 97, and may be journaled on the peripheries of the couplings. This annular member may be locked against rotation by a brake 100 or it may be permitted to freely rotate.

If the sleeve 78a be considered as the driving member and if the annular member 98 be locked against rotation and if the fluid be admitted to the left hand coupling, the pinion 99 will cause the member 96 to rotate in the opposite direction from the member 94 and the fluid in the left hand coupling will cause the shaft 74b to rotate in the opposite direction from the shaft 78a. If the fluid be admitted to the right hand coupling and the left hand one be empty then the right hand coupling will operate to drive the shaft 74b in the same direction as the sleeve 78a, and although the driving member 96 will be rotating in the opposite direction no power will be transmitted through the left hand coupling.

For forward driving with the right hand coupling filled, the member 98 may be released and freely rotate so that the driving member 96 of the empty coupling may rotate in the same direction as the driving member of the right hand coupling and thus reduce the resistance in the left hand coupling which would result from the circulation of air in the empty coupling with the driving and driven elements rotating in opposite directions.

In the foregoing description we have referred to certain parts of the couplings as being the driving members and the other parts as the driven members, and have referred to certain shafts as for driving and other for being driven. Obviously either part of any coupling will serve as either the driving or the driven element depending upon the point at which power is being applied.

Having thus described our invention, what we claim as new and desire to secure by Letters Patent is:

1. A construction of the character described, including a hollow drive shaft, a pair of hydraulic couplings encircling the same and each including a driving member secured to said shaft, a pair of driven members juxtaposed to said driving members and forming therewith a pair of working chambers, a pair of pinions encircling said shaft and connected to said driven members, passages leading from the interior of said shaft to each of said working chambers, and a slide valve within said shaft for opening or closing either of said passages.

2. A construction as described in claim 1 in which each working chamber has a discharge port at its periphery, valve mechanism for controlling said port, and a supply passage leading from the interior of said shaft to said valve mechanism for operating the valve mechanism by fluid pressure.

3. An apparatus of the character described, including a casing, a pair of shafts mounted in said casing, a pair of gears secured to one of said shafts, a pair of pinions coaxial with the other shaft, a pair of hydraulic couplings of the Föttinger type for transmitting power from said last mentioned shaft to either of said pinions, one of said pinions meshing with one of said gears, a reversing pinion for meshing with the other of said pinions and the other gear, all of said gears, pinions and couplings being mounted inside of said casing, each of said couplings having a discharge port at the periphery thereof, and said last mentioned shaft having an axial passage therethrough, each of said couplings having a passage connecting the working chamber thereof with the interior of said shaft, and a separate passage leading from the interior of said shaft to the periphery of the coupling, valve mechanism operated by fluid delivered through said last mentioned passages for operating said valve mechanism to control said discharge ports, and a single valve mechanism within the passage of said shaft and axially movable to open or close any of the other of said passages.

4. A power transmitting mechanism, including a shaft having a pair of hydraulic couplings of the Föttinger type mounted thereon, each coupling having its driving member secured to said shaft, sleeves at opposite ends of said couplings and connected to the driven members of the latter, said shaft being hollow and having separate passages leading to said couplings, and valve means for controlling the flow of fluid from said shaft to either of said couplings.

5. A power transmitting mechanism, including a shaft having a pair of hydraulic couplings of the Föttinger type mounted thereon, each coupling having its driving member secured to said shaft, sleeves at opposite ends of said couplings and connected to the driven members of the latter, said shaft being hollow and having separate passages leading to said couplings, and valve means within said shaft and slidable lengthwise thereof for controlling both of said passages.

6. A power transmitting mechanism, including a shaft having a pair of hydraulic couplings of the Föttinger type mounted thereon, each coupling having its driving member secured to said shaft, sleeves at opposite ends of said couplings and connected to the driven members of the latter, said shaft having two concentric passages therein, one of said passages communicating with one of said couplings and the other passage communicating with the other coupling, and valve means for controlling the supply of liquid through either of said passages.

7. A power transmitting mechanism, including a shaft having a pair of hydraulic couplings of the Föttinger type mounted thereon, each coupling having its driving member secured to said shaft, sleeves at opposite ends of said couplings and connected to the driven members of the latter, said shaft having two concentric passages therein, one of said passages communicating with one of said couplings and the other passage communicating with the other coupling, outlet valves on the periphery of said couplings, a valve for controlling the supply of liquid to either of said passages, and mechanism for shifting said valves to permit supply to and prevent escape of fluid from one coupling while shutting off the supply of liquid to and permitting escape of fluid from the other coupling.

8. A power transmitting mechanism including a shaft, a pair of bearings therefor, a pair of hydraulic couplings of the Föttinger type between said bearings and having their driving members connected together back to back and secured to said shaft intermediate of said bearings, a pair of sleeves directly rotatable upon and supported solely by said shaft between said couplings and said bearings, said couplings having driven members rigidly secured to said sleeves, pinions between and adjacent to said bearings and rigidly secured to said sleeves upon opposite sides of said couplings, and a driven shaft parallel to said first mentioned shaft and having gearing connections to both of said pinions, said first mentioned shaft having a passage extending lengthwise therethrough, and means for controlling the flow of liquid through said first mentioned shaft to either of said couplings.

9. A power transmitting mechanism, including a shaft having a pair of hydraulic couplings of the Föttinger type mounted thereon, each coupling having its driving member secured to said shaft, sleeves at opposite ends of said couplings, rotatable on and supported solely by said shaft and connected to the driven members of the latter, said shaft having two separate passages, one communicating with one of said couplings and the other communicating with the other coupling, valve mechanism for controlling the supply of liquid to said passages, and mechanism for operating said valve mechanism to permit supply to one coupling while shutting off the supply of liquid to the other coupling.

10. A power transmitting mechanism, including a shaft having a pair of hydraulic couplings of the Föttinger type mounted thereon, each coupling having its driving member secured to said shaft, sleeves at opposite ends of said couplings and connected to the driven members of the latter, said shaft having two separate passages, one communicating with one of said couplings and the other communicating with the other coupling, a pair of valves, one for controlling the supply of liquid to one of said passages and the other for controlling the supply of liquid to the other passage, and means for connecting said valves whereby the opening of one closes the other.

11. A power transmitting mechanism including a shaft, a pair of hydraulic couplings of the Föttinger type encircling the same and each having a driving element and a driven element, one element of each coupling being connected to said shaft, separate sleeves rotatable on said shaft for supporting the other two elements of said couplings, gearing connecting said other elements, said shaft having two separate passages, one connected with one of said couplings and the other connected with the other coupling, and valve mechanism for controlling the delivery of fluid from said passages alternately.

12. A power transmitting mechanism including a shaft, a pair of hydraulic couplings of the Föttinger type encircling the same and each having a driving element and a driven element, one element of each coupling being connected to said shaft, gearing connecting the other two elements of said couplings, said shaft having two separate passages, one connected with one of said couplings and the other connected with the other coupling, separate valves, one for controlling the admission of fluid to one passage and the other for controlling admission of fluid to the other passage, and means connecting said valves for operating them to permit supply to one coupling and shutting off the supply to the other coupling.

13. A power transmitting mechanism including a driven member and a driving member in axial alignment, a hydraulic coupling of the Föttinger type having a driving element connected to said driving member and a driven element connected to said driven member, two hydraulic couplings of the Föttinger type, one of the latter having its driving element connected to the driving member, and reversing gearing connecting the driven element of said last mentioned coupling to the driving element of the other of said two couplings, the driven element of said last mentioned coupling being connected to the driven member.

14. A power transmitting mechanism including a driving shaft, a casing having bearings supporting said shaft, a pair of sleeves supported solely by and rotatable on said shaft between said bearings and spaced apart axially, a pair of hydraulic couplings each having a driving member and a driven member, said driving members being connected to said shaft between said sleeves, and said driven members being connected to said sleeves, pinions on said sleeves within said casing and between said driven members and said bearings, a second shaft also supported by said casing, and having gearing within said casing meshing with said pinions, both of said couplings having passages communicating with the interior of said first mentioned shaft, and means for controlling the supply of liquid through said first mentioned shaft and said passages to said couplings alternatively.

15. A power transmitting mechanism including a casing, a pair of hydraulic couplings within said casing, and each having a driving member and a driven member, a driving shaft connected to said driving members, sleeves on said shaft upon opposite sides of said couplings, a second shaft supported by said casing, separate gearing within said casing and connecting said second shaft with both of said sleeves, said couplings having passages communicating with the interior of said first mentioned shaft, means for controlling the flow of operating fluid through said first mentioned shaft and said passages into said couplings alternatively, and a single pair of bearings upon opposite sides of said casing, and constituting the sole support for said first mentioned shaft and said sleeves.

16. A power transmitting mechanism, including a shaft having a pair of hydraulic couplings of the Föttinger type mounted thereon, each coupling having its driving member secured to said shaft, sleeves at opposite ends of said couplings and connected to the driven members of the latter, a second shaft, and gearing connecting said second shaft and both of said sleeves, said first shaft being hollow and having separate passages leading to said couplings, and valve means for controlling the flow of fluid from said first shaft to either of said couplings.

17. A power transmitting mechanism including a driving shaft, a pair of sleeves rotatable on said shaft and spaced apart axially, a pair of hydraulic couplings each having a driving member and a driven member, said driving members being connected to said shaft between said sleeves, and said driven members being connected to said sleeves, pinions on said sleeves, a casing enclosing said couplings and pinions, a second shaft having gearing within said casing meshing with said pinions, both of said couplings having passages communicating with the interior of said first mentioned shaft, and means for controlling the supply of liquid through said first mentioned shaft and said passages to said couplings alternatively.

18. A power transmitting mechanism including a casing, a pair of hydraulic couplings within said casing, and each having a driving member and a driven member, a driving shaft connected to said driving members, a second shaft parallel to said driving shaft and supported by said casing, separate gearing within said casing and connecting said second shaft with the driven members of both of said couplings, said couplings having passages communicating with the interior of said first mentioned shaft, means for controlling the flow of operating fluid through said first mentioned shaft and said passages into said couplings alternatively, and a single pair of bearings upon opposite sides of said casing, and constituting the sole support for said first mentioned shaft.

GUSTAV BAUER.
CARL SCHMIESKE.